(12) United States Patent
Cooper

(10) Patent No.: US 7,556,374 B1
(45) Date of Patent: Jul. 7, 2009

(54) CARABINER GLASSES

(76) Inventor: Martin R. Cooper, 10179 Commerce Park Dr., Cincinnati, OH (US) 45246

( * ) Notice: Subject to any disclaimer, the term of this patent is extended or adjusted under 35 U.S.C. 154(b) by 0 days.

(21) Appl. No.: 12/163,228

(22) Filed: Jun. 27, 2008

(51) Int. Cl.
*G02C 1/00* (2006.01)
(52) U.S. Cl. .................. 351/158; 351/112; 351/121
(58) Field of Classification Search .................. 351/41, 351/111, 112, 121, 158
See application file for complete search history.

(56) References Cited

U.S. PATENT DOCUMENTS

| | | | |
|---|---|---|---|
| 2,097,371 A | 10/1937 | Hon | |
| 3,038,377 A | 6/1962 | Maxson | |
| 3,394,980 A * | 7/1968 | Dym | ............................. 351/41 |
| D312,773 S | 12/1990 | Salinas | |
| 6,017,120 A | 1/2000 | McCormick | |
| 6,343,859 B1 | 2/2002 | McCormick | |
| 6,533,414 B2 | 3/2003 | Newler | |
| 6,543,895 B2 * | 4/2003 | Fukai | ......................... 351/112 |
| 6,979,143 B2 | 12/2005 | Goldberg | |
| 2004/0205255 A1 | 10/2004 | Joachim | |
| 2004/0250386 A1 | 12/2004 | Goldberg | |

* cited by examiner

*Primary Examiner*—Huy K Mai
(74) *Attorney, Agent, or Firm*—Ulmer & Berne LLP

(57) ABSTRACT

A frame for glasses includes two temple bars and a lens receiving portion. The temple bar comprises a first end and a second end. The second end of at least one of the temple bars includes a fastening device having a body portion and a closure member, which is configured to move between an open position and a closed position. A temple-bar is also provided for herein.

13 Claims, 4 Drawing Sheets

CARABINER GLASSES

TECHNICAL FIELD

Frames for glasses with fastening device are provided.

BACKGROUND

Conventional glasses such as eyeglasses, sunglasses, and safety glasses, are generally designed to include frames bearing lenses to aid in vision, protect a user's eyes, or for aesthetic reasons. Such glasses do not offer convenient methods of storage. It can be a burden to carry glasses or to find a proper place to rest glasses. Glasses may break easily when placed in a pocket, purse, briefcase, or bag. Also, not having a convenient place to put glasses, often leads to a search to find them and sometimes even the loss of the glasses. Therefore, it is desirable to provide glasses which are convenient for users to carry and can easily be stored while not in use.

SUMMARY

In accordance with one embodiment, a frame for glasses comprises two temple bars and a lens receiving portion. Each temple bar comprises a first end and a second end. The second end of at least one of the temple bars comprises a body portion and a closure member. The body portion has a substantially curvilinear shape and comprises an elongated member having a first portion and a second portion. The first portion of the body portion comprises an upper arm member integrally attached at the first portion of the elongated member. The second portion of the body portion comprises a lower arm member integrally attached at the second portion of the elongated member. The closure member is configured to move between an open position and a closed position. The closure member and the body portion define an opening when the closure member is in the closed position. The lens receiving portion and the first end of each temple bar are configured to be attached.

In accordance with another embodiment, a temple bar for glasses comprises a first end and a second end. The second end comprises a body portion and a closure member. The body portion is substantially curvilinear shape and comprises an elongated member having a first portion and a second portion. The first portion of the body portion comprises an upper arm member integrally attached at the first portion of the elongated member. The second portion of the body portion comprises a lower arm member integrally attached at the second portion of the elongated member. The closure member is configured to move between an open position and a closed position. The closure member and the body portion define an opening when the closure member is in the closed position.

BRIEF DESCRIPTION OF THE DRAWINGS

It is believed that certain embodiments will be better understood from the following description taken in conjunction with the accompanying drawings in which.

DETAILED DESCRIPTION

Figure 1:
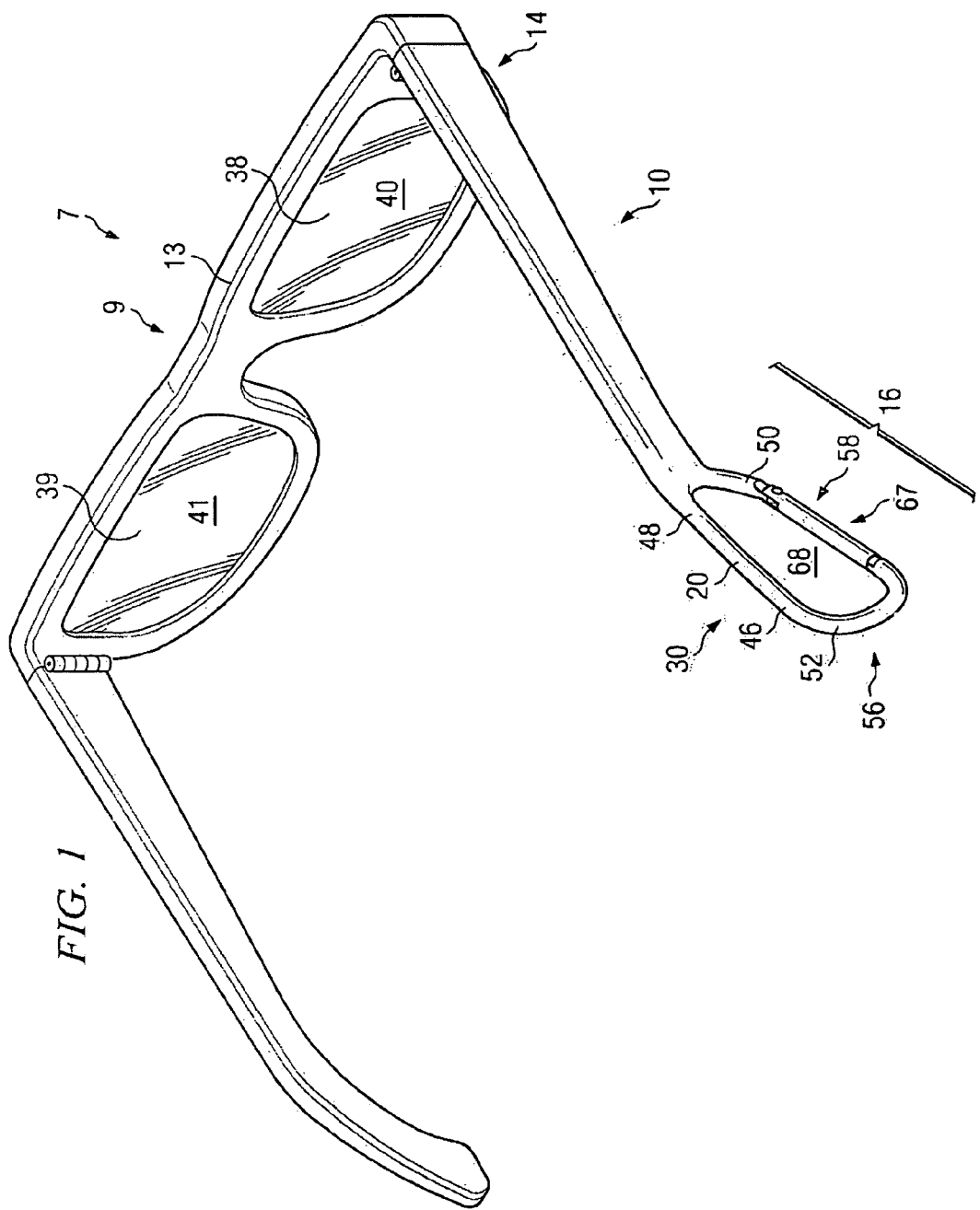
FIG. 1 is a perspective view depicting a frame for a pair of glasses having a temple bar with an integrated fastening device.

Embodiments are hereinafter described in detail in connection with the views and examples of FIGS. 1-6, wherein like numbers indicate the same or corresponding elements throughout the views. It will also be appreciated that the glasses discussed herein can include any of a variety of types, including, for example reading glasses, sunglasses, safety glasses, or any other suitable type of glasses. As illustrated in the embodiment of FIG. 1, a frame 9 for glasses 7 can include at least one temple bar 10 and a lens receiving portion 13. The frame 9 can be formed partially or entirely of metal, plastic, or aluminum. However, any of a variety of other materials can additionally or alternatively be provided to form the frame. The lens receiving portion can be configured to hold at least one lens. For example the lens receiving portion 13 can be configured to hold two lenses (e.g., items 40 and 41) as shown in the embodiment of FIG. 1. As shown in FIG. 1, the lens receiving portion 13 includes a first opening 38 and a second opening 39, each of which can have a similar shape and are configured to hold lenses (e.g., items 40 and 41). It will be appreciated that the lens receiving portion can include openings having different configurations and shapes which can accommodate various types of lenses. In addition, a lens receiving portion can be formed by wire used to connect lenses together and/or lenses to temple bars.

Figure 2:
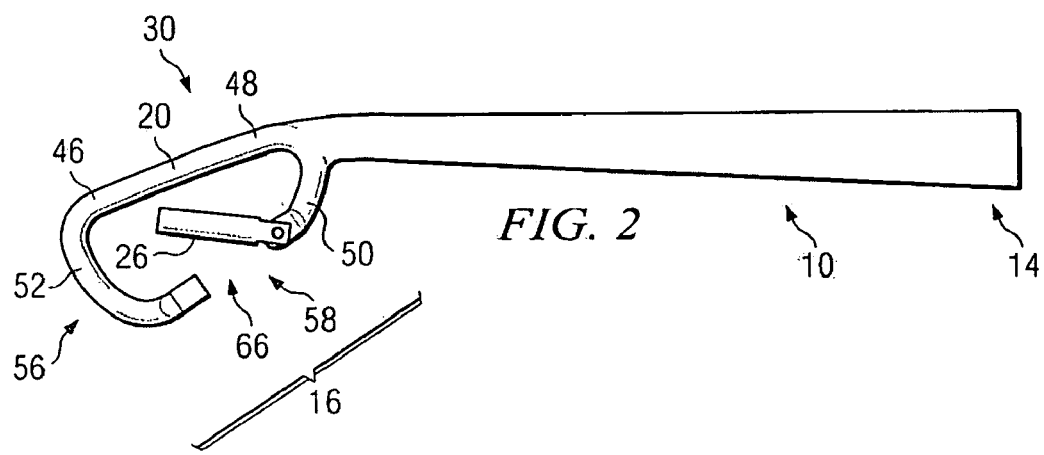
FIG. 2 illustrates the temple bar of FIG. 1 with the fastening device having a gated clip in an open position.
Figure 3:
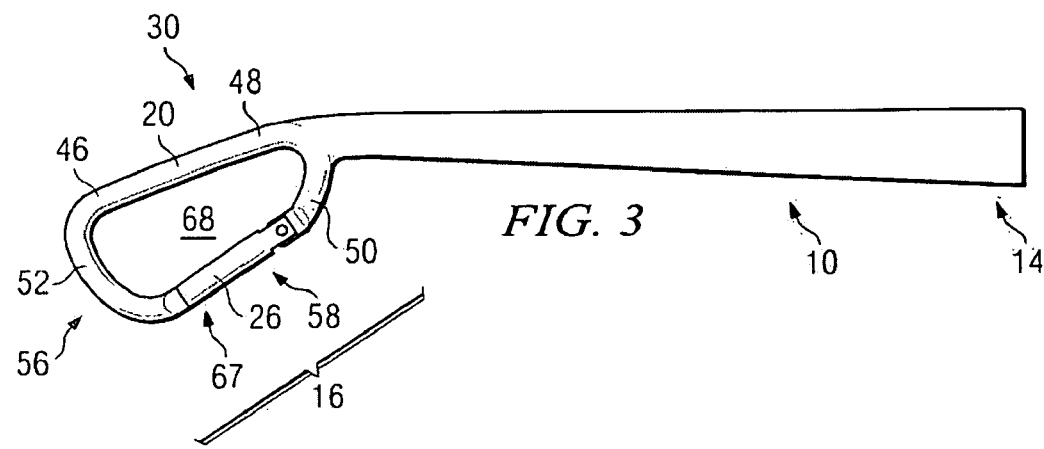
FIG. 3 illustrates the temple bar of FIG. 2, wherein the fastening device is in a closed position.

The temple bar 10 can include a first end 14 and a second end 16 as shown in FIGS. 1-3. The second end 16 of the temple bar 10 can include a body portion 56 and a closure member 58 forming a fastening device (e.g., a carabiner 30) as illustrated in FIGS. 1-3.

The body portion 56 can have a substantially curvilinear shape, as shown in FIGS. 1-3. It will be appreciated that the substantially curvilinear shape of the body portion can facilitate comfort for the wearer and keep hair from getting tangled in the glasses. However, it will also be appreciated that the body portion can include any variety of additional or alternative shapes or forms. Differing shapes or forms can add to the aesthetic appeal of the glasses.

As further illustrated in FIGS. 1-3, the body portion 56 can include an elongated member 20 having a first portion 46 and a second portion 48. An upper arm member 52 can be integrally attached at the first portion 46 of the elongated member 20 as shown in the embodiment of FIG. 1. Moreover, as shown in the embodiment of FIGS. 1-3, a lower arm member 50 can be integrally attached at the second portion 48 of the elongated member 20.

The closure member 58 can connect the upper arm member 52 and the lower arm member 50 as depicted in FIGS. 1 and 3. As further illustrated in FIGS. 1-3, the closure member 58 can be configured to move between an open position 66 and a closed position 67. The body portion 56 and the closure member 58 can define an opening 68 when the closure member 58 is in the closed position 67 as illustrated in FIGS. 1 and 3.

In accordance with one embodiment, as shown in FIG. 2 and FIG. 3, the closure member 58 can comprise a gated clip 26. The gated clip 26 can be pivotally attached to move between an open position 66 and a closed position 67. As shown in FIG. 2 the gated clip 26 can be pivotally attached at the lower arm member 50. Alternatively, it will be appreciated that the gated clip can be associated with the closure member to pivotally attached at an upper arm member. It will be appreciated that the closure member can be used to grasp items. For example, a user can move a closure member from an open position to receive an item (e.g., article of clothing) to a closed position to grasp the item. This arrangement enables the user to conveniently clip a pair glasses onto a variety of other items as well such as a belt loop, shirt, vest, hook, key ring, or the like, or onto any other suitable object desired by the user. Thus, such an arrangement allows the user to have easy access to their glasses while also leaving their hands free to perform other functions.

Figure 4:
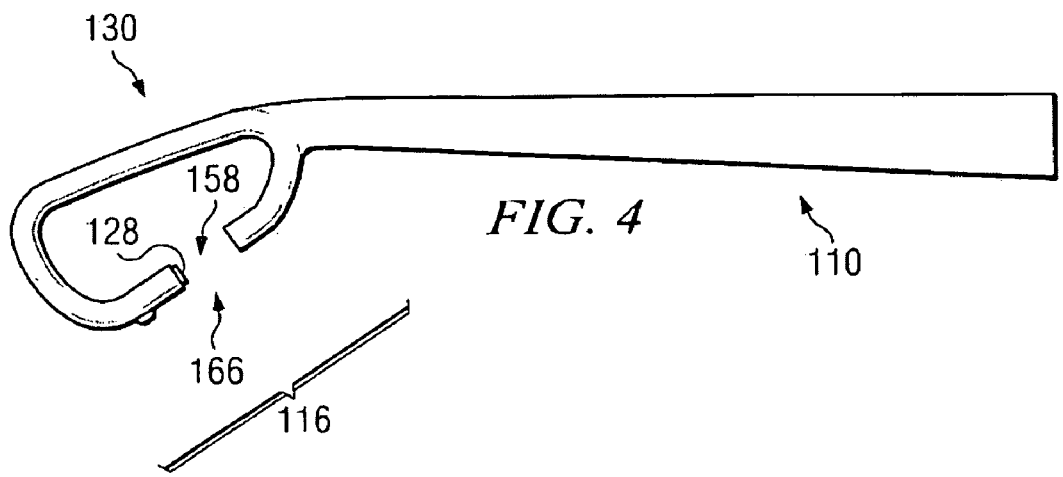
FIG. 4 illustrates a temple bar with a fastening device having a spring clip in an open position.
Figure 5:
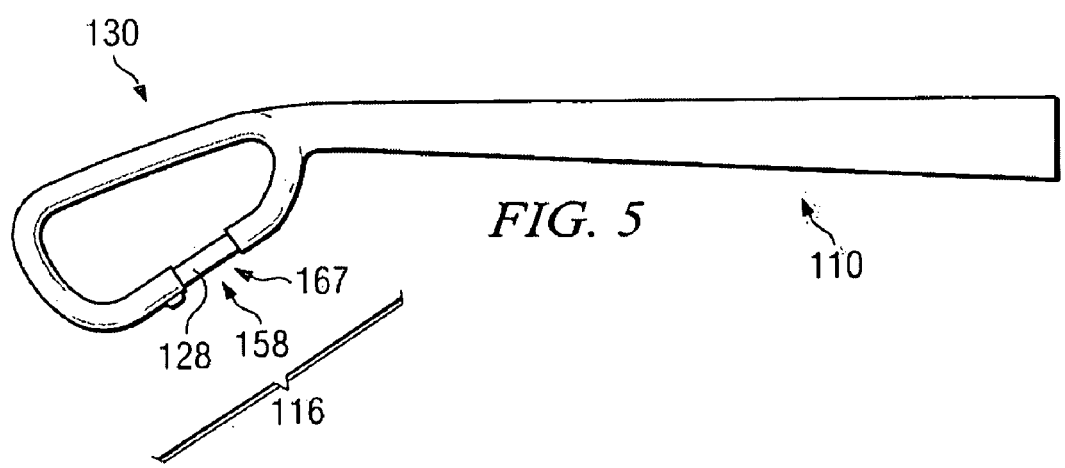
FIG. 5 illustrates the temple bar of FIG. 4, wherein the fastening device is in a closed position.

In accordance with an alternative embodiment, as shown in FIG. 4 and FIG. 5, a second end 116 of a temple bar 110 includes a fastening device (e.g., a carabiner 130) which comprises a closure member 158 comprising a spring clip 128. Further illustrated in FIGS. 4 and 5, the spring clip 128 can be attached to move between an open position 166 and a closed position 167, thus allowing for the closure member 158 to grasp onto any of a variety of items as discussed herein. It will be appreciated that the spring clip can be associated with the closure member to open from the upper arm member or the lower arm member. The spring clip 128 can be configured to move along a substantially longitudinal path as it travels from the open position 166 to the closed position 167.

Figure 6:
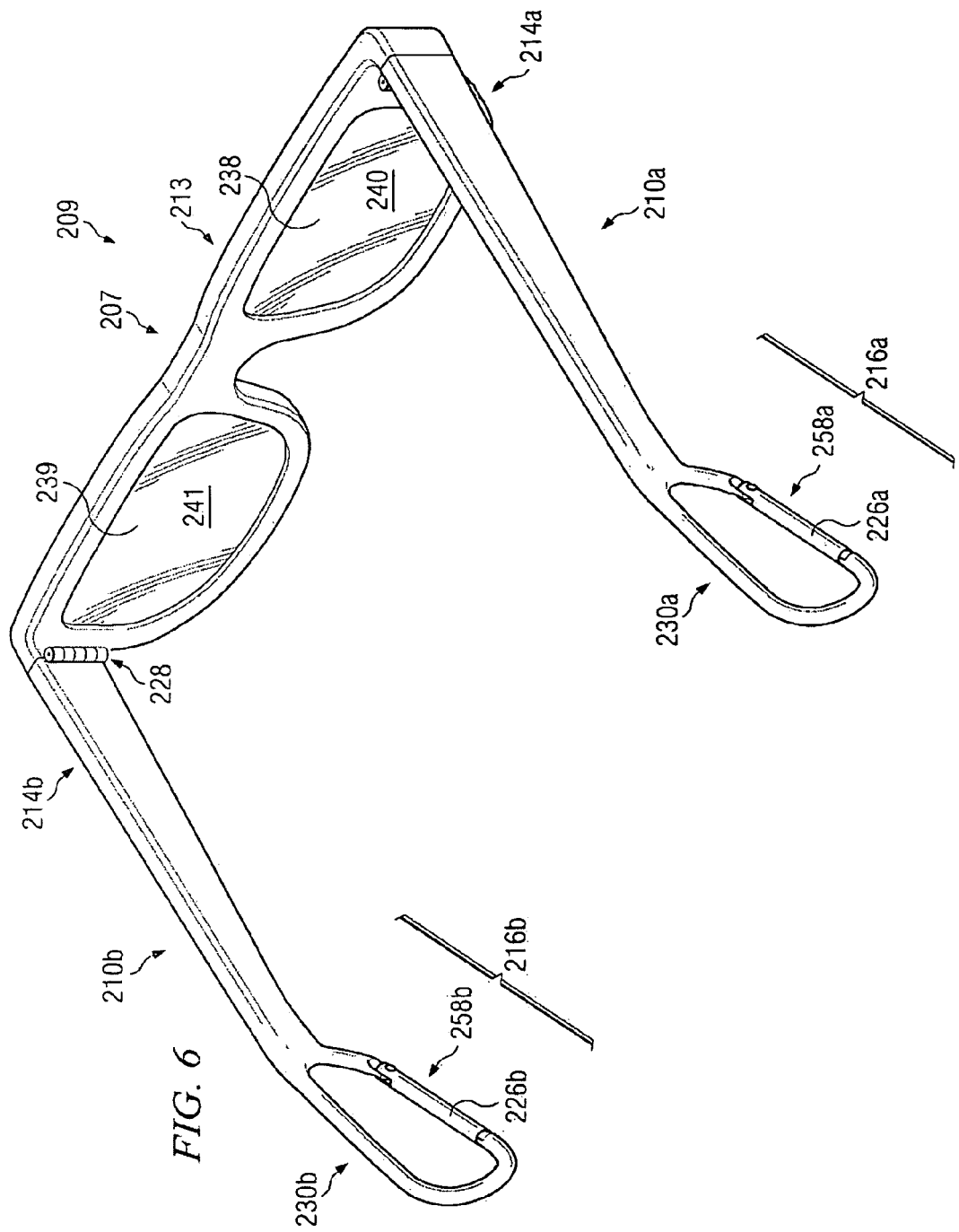
FIG. 6. is a perspective view illustrating a frame for a pair of glasses having temple bars with fastening devices.

In accordance with another alternate embodiment, as shown in FIG. 6, a frame 209 for glasses 207 can comprise two fastening devices (e.g., carabiners 230a, b) at second ends 216a, b of each of the temple bars 210a, b. The fastening device includes closure members 258a, b can each comprise gated clips 226a, b. It will be appreciated that the fastening devices can include closure members, including for example spring clips.

As illustrated in FIG. 6, the frame 209 for glasses 207 can comprise a lens receiving portion 213. The lens receiving portion 213 and first ends 214a, b of each of the temple bars 210a, b can be attached by a hinged arrangement 208 as depicted in FIG. 6. It will be appreciated that a first end of a temple bar can be attached to a lens receiving portion by alternative arrangements, including for example integral connections or spring connections.

The lens receiving portion 213, as shown in FIG. 6, can further define a first opening 238 and a second opening 239. The first opening 238 and the second opening 239 can be configured to hold lenses (e.g., items 240 and 241) as illustrated in FIG. 6. Such lenses can include, for example, corrective lenses or uv rated lenses. It will be appreciated that the lenses may be made of a variety of materials including for example, glass or plastic.

The foregoing description of embodiments and examples has been presented for purposes of illustration and description. It is not intended to be exhaustive for to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A frame for glasses, the frame comprising:
   two temple bars each comprising a first end and a second end, wherein the second end of at least one of the temple bars comprises:
      a body portion having a substantially curvilinear shape and comprising an elongated member having a first portion and a second portion, an upper arm member integrally attached at the first portion of the elongated member, and a lower arm member integrally attached at the second portion of the elongated member; and
      a closure member configured to move between an open position and a closed position, wherein the body portion and the closure member define an opening when the closure member is in the closed position,
   a lens receiving portion, wherein the lens receiving portion and the first end of each temple bar are configured to be attached.

2. The frame according to claim 1, wherein the lens receiving portion and the first end of each temple bar are attached by a hinged arrangement.

3. The frame according to claim 1, wherein the closure member contacts the upper arm member and the lower arm member when the closure member is in the closed position.

4. The frame according to claim 1, wherein the closure member comprises a gated clip being pivotally attached to move between the open position and the closed position.

5. The frame according to claim 1, wherein the closure member comprises a spring clip being attached to move between the open position and the closed position.

6. The frame according to claim 5, wherein the left opening and the right opening are configured to hold corresponding lens.

7. The frame according to claim 1, wherein the closure member can be moved to the open position to receive an article of clothing and moved to the closed position to grasp the article of clothing.

8. The frame according to claim 7, wherein the corresponding lens can comprises corrective lens or uv rated lens.

9. The frame according to claim 1, wherein the closure member comprises a carabiner.

10. The frame according to claim 1, wherein the lens receiving portion further defines a left opening and a right opening.

11. A pair of glasses having the frame of claim 1.

12. A temple bar for glasses, the temple bar comprises:
   a first end; and
   a second end, wherein the second end comprises:
      a body portion having a substantially curvilinear shape and comprising an elongated member having a first portion and a second portion, an upper arm member integrally attached at the first portion of the elongated member, and a lower arm member integrally attached at the second portion of the elongated member; and
      a closure member configured to move between an open position and a closed position, wherein the body portion and the closure member define an opening when the closure member is in the closed position.

13. The temple bar of claim 12, wherein the first end is configured to attach to a frame for a pair of glasses by a hinged arrangement.

* * * * *